US010549303B2

(12) United States Patent
O'Connell et al.

(10) Patent No.: US 10,549,303 B2
(45) Date of Patent: Feb. 4, 2020

(54) WIRE HARNESS T-JOINT MOUNT FOR AN AGRICULTURAL PRODUCT SPRAYER

(71) Applicant: CNH Industrial America LLC, New Holland, PA (US)

(72) Inventors: Charles D. O'Connell, Willmar, MN (US); Rex L. Ruppert, Benson, MN (US); Jeffrey S. Martin, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 129 days.

(21) Appl. No.: 15/820,785

(22) Filed: Nov. 22, 2017

(65) Prior Publication Data

US 2019/0151881 A1 May 23, 2019

(51) Int. Cl.
| | |
|---|---|
| *B05B 13/02* | (2006.01) |
| *B05B 13/00* | (2006.01) |
| *A01G 25/09* | (2006.01) |
| *B05B 15/60* | (2018.01) |
| *B05B 15/65* | (2018.01) |

(Continued)

(52) U.S. Cl.
CPC .......... *B05B 13/0278* (2013.01); *A01G 25/09* (2013.01); *A01M 7/0053* (2013.01); *B05B 13/005* (2013.01); *B05B 15/60* (2018.02); *B05B 15/65* (2018.02); *A01C 23/00* (2013.01); *A01M 7/006* (2013.01)

(58) Field of Classification Search
CPC ... B05B 13/0278; B05B 13/005; B05B 15/60; B05B 15/65; A01C 23/00; A01M 7/0053; A01M 7/005; A01M 7/006; A01G 25/09

USPC ... 239/1, 159–169, 600, 423, 426, 428, 742, 239/550

See application file for complete search history.

(56) References Cited

U.S. PATENT DOCUMENTS

| | | | | |
|---|---|---|---|---|
| 2,544,176 | A | * | 3/1951 | Palmer .................. B05B 15/658 239/550 |
| 3,158,324 | A | | 11/1964 | Oehler et al. |

(Continued)

OTHER PUBLICATIONS

Wilger, Quick-Nut SST Fluid Supply System, http://www.wilger.net/images/downloads/QUICK_NUT_SST.pdf, Dec. 28, 2016.

(Continued)

*Primary Examiner* — Steven J Ganey
(74) *Attorney, Agent, or Firm* — Rebecca L. Henkel; Rickard K. DeMille

(57) ABSTRACT

A mounting arrangement and method are provided for securing a T-joint in a control cable connectable in electrical communication with an electrical device, such as an electrically controlled nozzle, attached to a mounting surface such as the boom of an agricultural product sprayer. The mounting arrangement includes a base block adapted for fixed attachment to the mounting surface, and a pair of first and second clamping shells adapted and cooperatively configured for attachment to the base block and one another to define an internal cavity of the mounting arrangement between the clamping shells and the base block for receiving and retaining the T-joint within the mounting arrangement. The mounting arrangement is attached to the boom with a single threaded fastener. The clamping shells are identical and lock to one another and the base block without additional fasteners.

20 Claims, 8 Drawing Sheets

(51) Int. Cl.
  *A01M 7/00* (2006.01)
  *A01C 23/00* (2006.01)

(56) References Cited

U.S. PATENT DOCUMENTS

| | | | |
|---|---|---|---|
| 4,445,657 A | 5/1984 | Breckenridge | |
| 4,449,667 A | 5/1984 | Tyler | |
| 4,915,305 A | 4/1990 | O'Brien et al. | |
| 5,516,044 A | 5/1996 | Thorstensson | |
| 5,653,389 A | 8/1997 | Henderson et al. | |
| 5,697,650 A * | 12/1997 | Brown | B05B 15/658 |
| | | | 285/197 |
| 6,053,427 A | 4/2000 | Wilger et al. | |
| 6,079,638 A | 6/2000 | Chang | |
| 6,193,166 B1 | 2/2001 | Miller et al. | |
| 6,375,089 B1 | 4/2002 | Taylor et al. | |
| 6,669,120 B2 | 12/2003 | Vernia | |
| 7,066,402 B2 | 6/2006 | Goebel et al. | |
| 9,140,398 B2 * | 9/2015 | Lang | F16L 55/1108 |
| 2004/0124283 A1 | 7/2004 | Medici et al. | |
| 2012/0000991 A1 | 1/2012 | Hloben | |
| 2013/0037625 A1 | 2/2013 | Arenson et al. | |
| 2013/0144827 A1 | 6/2013 | Trevino et al. | |
| 2013/0256433 A1 | 10/2013 | Gunthorpe | |
| 2015/0289443 A1 | 10/2015 | Garuti et al. | |
| 2015/0367357 A1 | 12/2015 | Humpal et al. | |
| 2016/0324137 A1 | 11/2016 | Mellin | |
| 2017/0050206 A1 * | 2/2017 | Bullock | B05B 13/0278 |

OTHER PUBLICATIONS

Case IH, AIM Command Flex, https://www.realagriculture.com/2016/09/case-ih-brings-aim-command-flex-to-2017-sprayers/, Dec. 28, 2016.

* cited by examiner

WIRE HARNESS T-JOINT MOUNT FOR AN AGRICULTURAL PRODUCT SPRAYER

FIELD OF THE INVENTION

This invention generally relates to wire harnesses and cables, and more particularly to wire harnesses suitable for use in an agricultural product sprayer.

BACKGROUND OF THE INVENTION

Modern agricultural sprayers use arrays of multiple spray nozzles attached to booms that may span 140 feet, or more. Modern sprayers also utilize advanced spraying techniques in which the individual nozzles are electrically controlled by a sophisticated control system that can alter the spray pattern, turn individual nozzles off and on during turns to prevent overlap, and provide monitoring and feedback of nozzle performance.

Electrical solenoids and electronic monitoring devices at each nozzle are interconnected to one another and to an electrical spray control unit by a wire harness, or cable arrangement. The wire harness or cable arrangement must be routed along and supported by the booms, in order to interconnect the individual nozzles to the spray control unit.

In the past, these harnesses and cables were tied to the booms with commercially available tie-wraps and clamps. Although these prior approaches to securing the harnesses and cables worked satisfactorily enough, installation of the harnesses was more labor intensive and required more parts than is desirable. Repeatability of installation, aesthetic appearance reliability of the installation was also highly dependent upon the skill of the installer or repair technician.

It is desirable, therefore, to provide an improved mounting arrangement for routing and securing electrical wire harnesses and/or cables in an agricultural applications, in a manner that simplifies and facilitates installation. It is specifically desirable that such an improved mounting arrangement utilize a minimum number of parts, be highly repeatable and reliable, and provide an aesthetically pleasing and rugged appearance.

BRIEF SUMMARY OF THE INVENTION

The invention provides a mounting arrangement and method for securing a T-joint in a wire harness or control cable arrangement that is connectable in electrical communication with an electrical device, such as an electrically controlled nozzle, that is attached to a mounting surface, such as a boom of an agricultural product sprayer. The mounting arrangement includes a base block adapted for fixed attachment to the boom of the agricultural product sprayer, and a pair of first and second clamping shells adapted and cooperatively configured for attachment to the base block and one another to define an internal cavity of the mounting arrangement between the clamping shells and the base block for receiving and retaining the T-joint within the mounting arrangement. The mounting arrangement may be attached to the boom with a single threaded fastener. The clamping shells may be identical and lock to one another and the base block without additional fasteners.

The invention may be utilized, in various forms, with T-joints adapted for connection to a wide variety of electrical devices including, but not limited to, electrically controlled nozzles, sensing units, junction boxes, control units, lighting, etc.

In some forms of the invention, where the T-joint includes a molded joint-boot, the internal cavity may be configured to receive and retain the joint-boot. The molded boot of the T-joint and the clamping shells respectively may be configured to include cooperatively engaging alignment features for aligning and securing the T-joint within the internal cavity of the mounting arrangement.

The base block and clamping shells may be configured to include cooperatively engaging alignment features for aligning the clamping shells with one another and the base block. The base block and clamping shells may be further configured to include cooperatively engaging locking features for removably locking at least one of the clamping shells to the base block. The first and second clamping shells may also be identical, in some forms of the invention where the base block and clamping shells include cooperatively engaging alignment features and/or cooperatively engaging locking features.

In some forms of the invention, a T-joint mounting arrangement may include one or more of the following features: (a) identical first and second clamping shells; (b) a T-joint having a molded joint-boot, with the internal cavity of the mounting arrangement being configured to receive and retain the joint-boot; (c) the molded boot of the T-joint and the clamping shells are respectively configured with cooperatively engaging alignment features for aligning the T-joint within the internal cavity of the mounting arrangement; (d) the base block and clamping shells include cooperatively engaging alignment features for aligning the clamping shells with one another and the base block; and/or, (e) the base block and clamping shells are configured to include cooperatively engaging locking features for removably locking at least one of the clamping shells to the base block.

The invention may also take the form of an agricultural machine, such as an agricultural product sprayer having a boom, an electrical device, such as an electrically controlled nozzle attached to a mounting surface, such as the boom, and a control cable including a T-joint of the control cable connectable in electrical communication with the electrical device, where the T-joint is secured to the boom by a T-joint mounting arrangement according to the invention.

In a method, according to the invention, may include using a T-joint mounting arrangement mounting in accordance with the invention for securing a T-joint of a control cable to a boom of an agricultural product sprayer, where the control cable is connectable in electrical communication with an device, such as an electrically controlled nozzle attached to a boom of the agricultural product sprayer.

A method, according to the invention may also include fixedly attaching the base block to the boom, or to another mounting surface, with a single threaded fastener.

Where the first and second clamping shells are identical, the T-joint includes a molded joint-boot and the internal cavity is configured to receive and retain the joint-boot, the molded joint-boot of the T-joint and the clamping shells respectively include cooperatively engaging alignment features for aligning the T-joint within the internal cavity of the mounting arrangement, the base block and clamping shells include cooperatively engaging alignment features for aligning the clamping shells with one another and the base block, the base block and clamping shells include cooperatively engaging locking features for removably locking at least one of the clamping shells to the base block, a method according to the invention may further include one or more of the steps of: (a) locking a first one of the clamping shells to the base block; (b) positioning the molded joint-boot of the T-joint on the base block with the cooperatively engaging alignment features of the first clamping shell and the molded joint-boot of the T-joint engaging one another; and/or (c) locking the second clamping shell on to the base block and first clamping shell, to thereby secure the T-joint within the internal cavity of the mounting arrangement.

Other aspects, objects and advantages of the invention will be apparent from the following detailed description and accompanying drawings of exemplary embodiments.

BRIEF DESCRIPTION OF THE DRAWINGS

The accompanying drawings illustrate several aspects of the present invention and, together with the description, serve to explain the principles of the invention. In the drawings.

While the invention is described herein in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
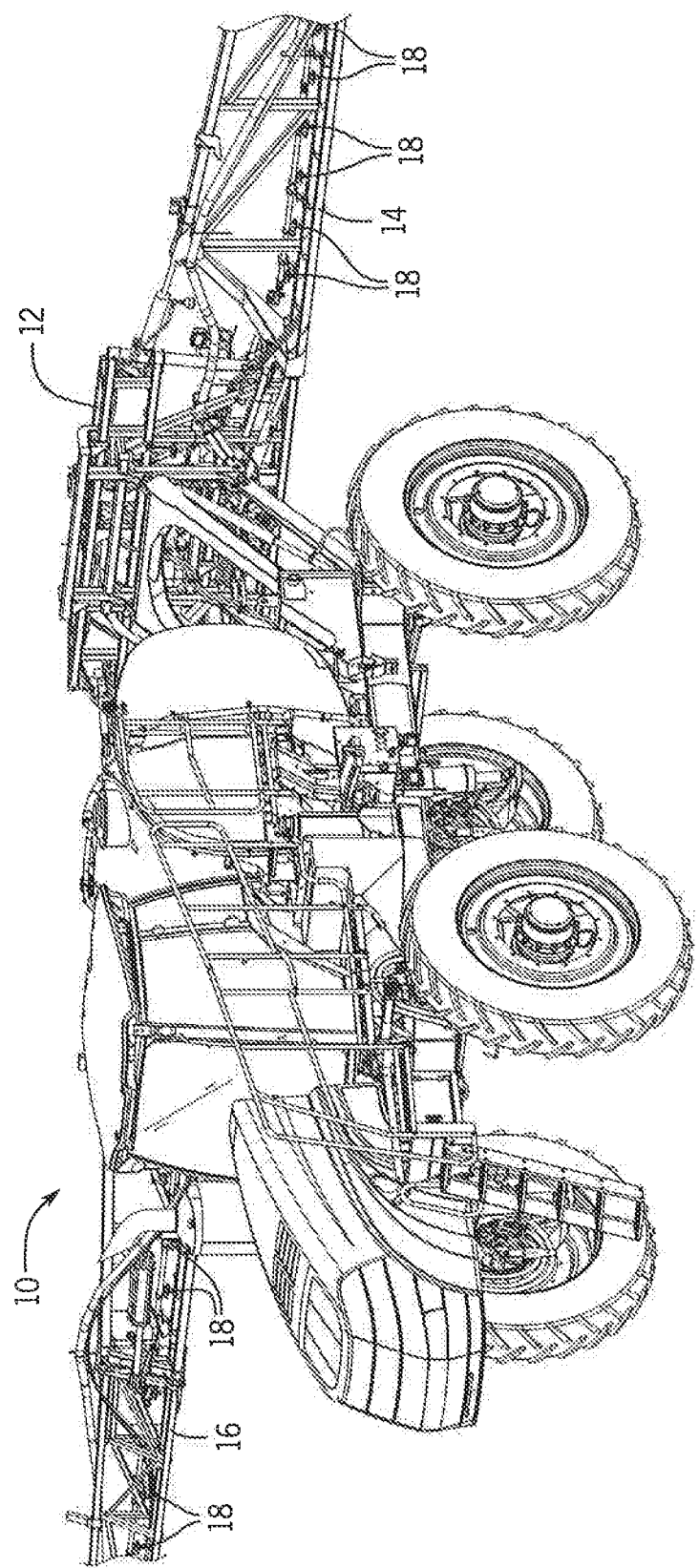
FIG. 1 is a perspective illustration of an exemplary embodiment of an agricultural product applicator, including a sprayer having T-joints of a wire harness secured to a boom of the sprayer by an exemplary embodiment of a T-joint mounting arrangement, according to the invention.

FIG. 1 shows an exemplary embodiment of the invention in the form of an agricultural product applicator 10 including a sprayer 12 having left and right booms 14,16, and a plurality of electrical devices, in the form of electrically controlled spray nozzles 18, attached to the booms 14,16, for application of liquid agricultural products, such as herbicides, insecticides and liquid fertilizers.

Figure 2:
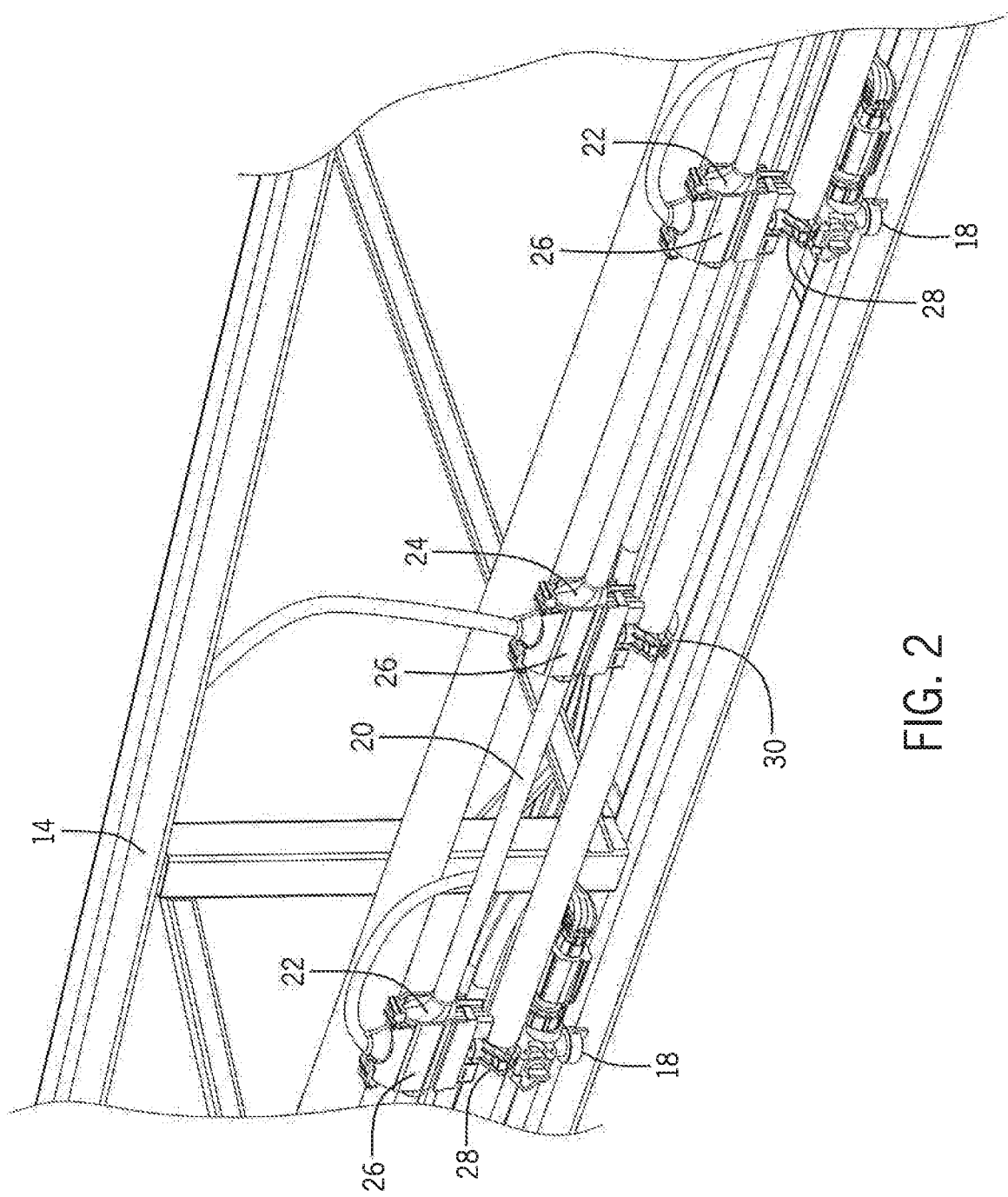
FIG. 2 is an enlarged, perspective rear view of a portion of a left boom of the sprayer of FIG. 1.

As shown in FIG. 2, which is an enlarged rear view of part of the left boom 14, a nozzle control cable 20 is routed along the boom 14. The cable 20 includes a plurality of nozzle-control T-joints 22 of the control cable 20 that are connectable in electrical communication with the electrically controlled nozzles 18, for controlling the nozzles 18. The cable 20 also includes an additional T-joint connection 24, for connecting the cable 20 to an electrical control unit (not shown) that provides operating power to, and control of the nozzles 18, and receives diagnostic information via the cable 20 regarding performance of the nozzles 18.

Each of the T-joints 22,24 in the cable 20 is secured to a mounting surface, in the form of a spray delivery tube of the boom 14 by a T-joint mounting arrangement 26, according to the invention. The nozzle control T-joints 22 in the exemplary embodiment are fixedly attached to a clamp arrangement 28 that attaches each nozzle 18 to the boom 14. The additional T-joint 24, for connecting the cable 20 to the electrical control unit, is secured to the boom 14 with a dedicated clamping arrangement 30.

Figure 3:
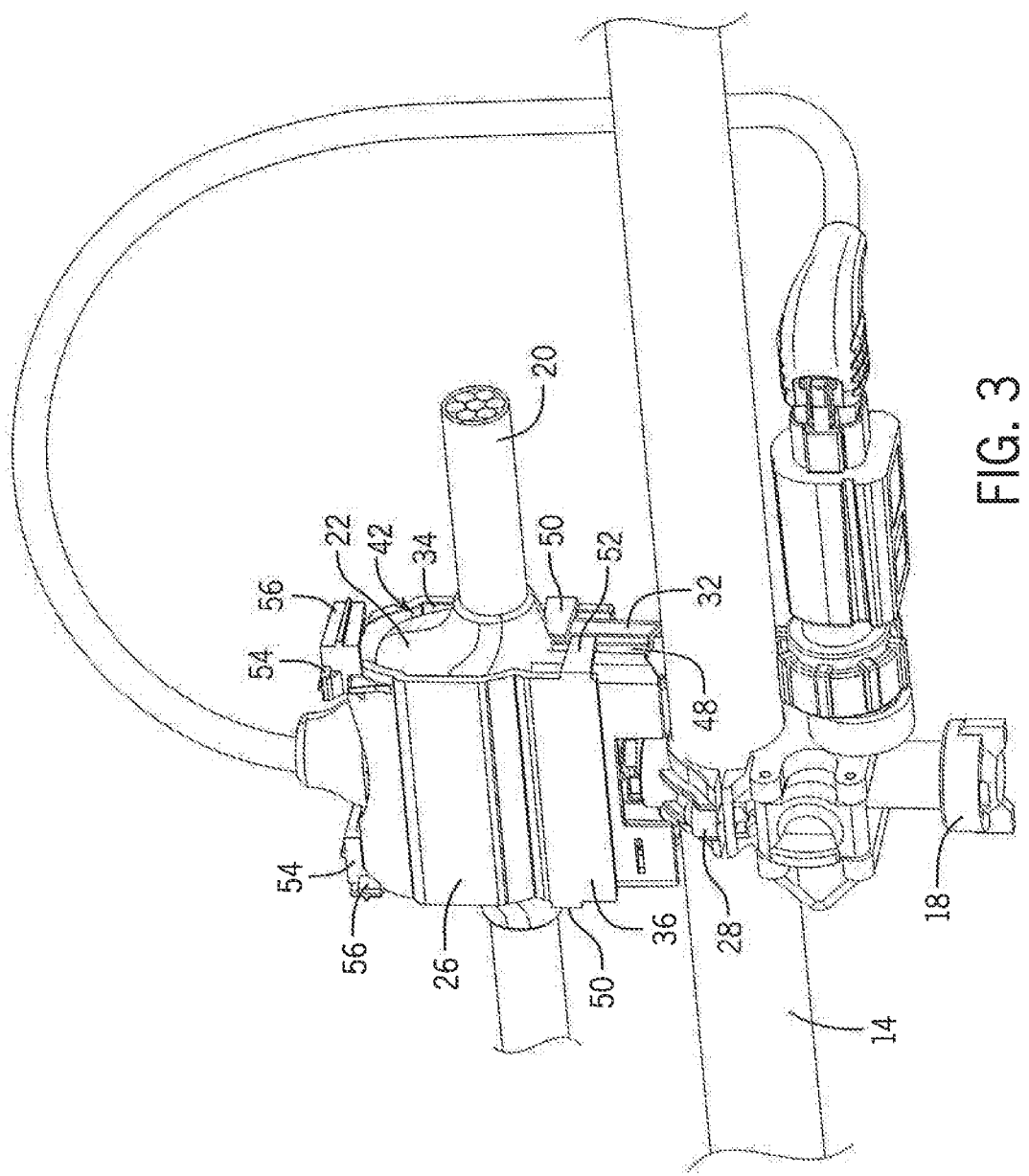
FIG. 3 is an enlarged perspective view of a T-joint secured to a nozzle of FIGS. 1 and 2.

FIG. 3 is an enlarged view showing one of the nozzle-control T-joints 22 of the nozzle control cable 20 secured by a T-joint mounting arrangement 26 to a clamping arrangement 28 securing one of the nozzle bodies 18 to the spray delivery tube of the boom 14.

Figure 4:
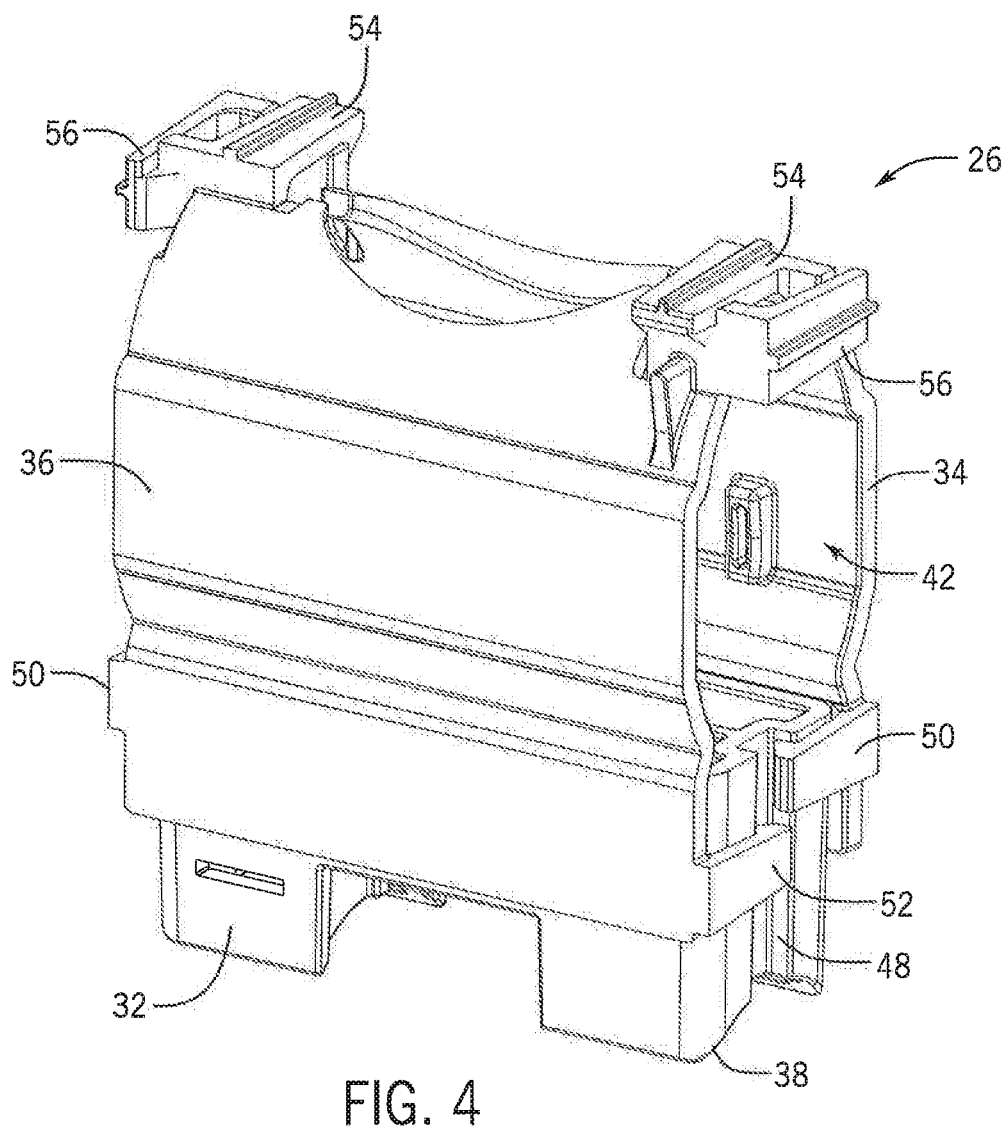
FIG. 4 is a perspective illustration of an exemplary embodiment of a T-joint mounting arrangement, according to the invention.

FIG. 4 shows the clamping arrangement 26 of FIG. 3 isolated from the remainder of the elements of FIG. 3.

As shown in FIGS. 3-6, and described in more detail below, the exemplary embodiment of the clamping arrangement 26 includes three parts consisting of a base block 32, and two identical first and second clamping shells 34,36.

Figure 5:
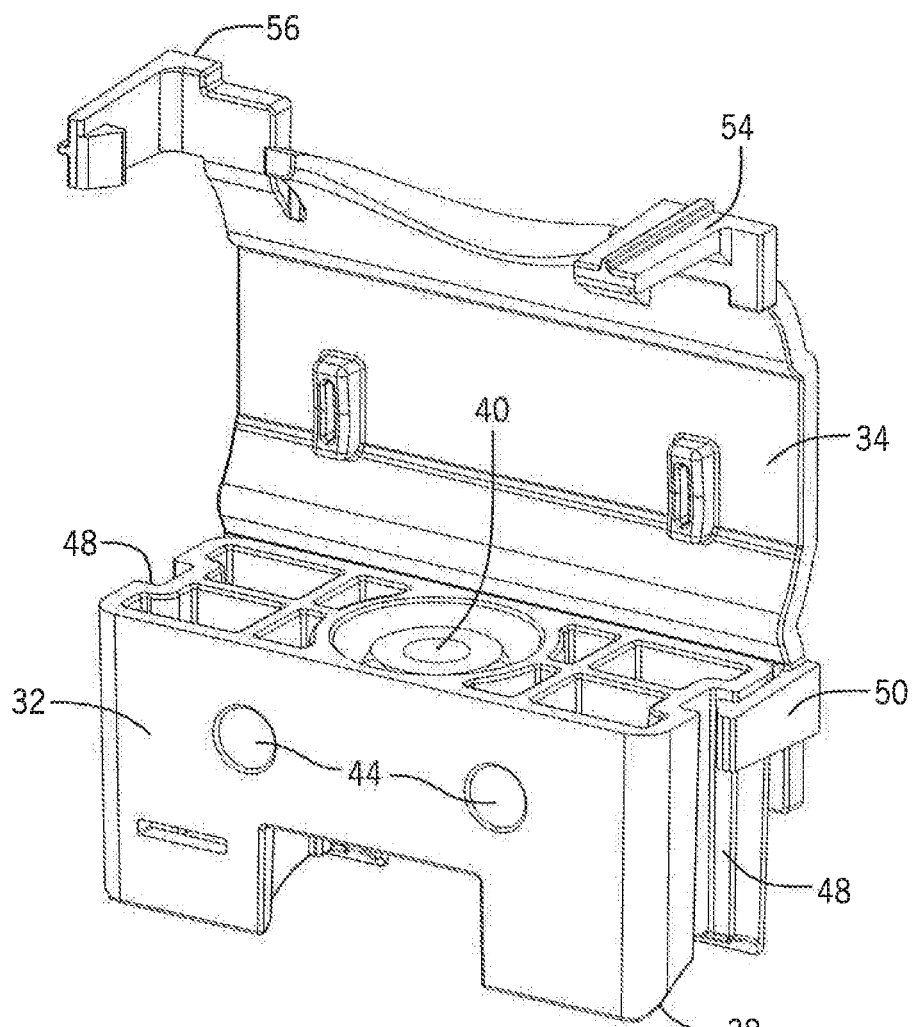
FIGS. 5 and 6 are perspective illustrations of components of the exemplary embodiment of the T-joint mounting arrangement of claim 4.
Figure 6:
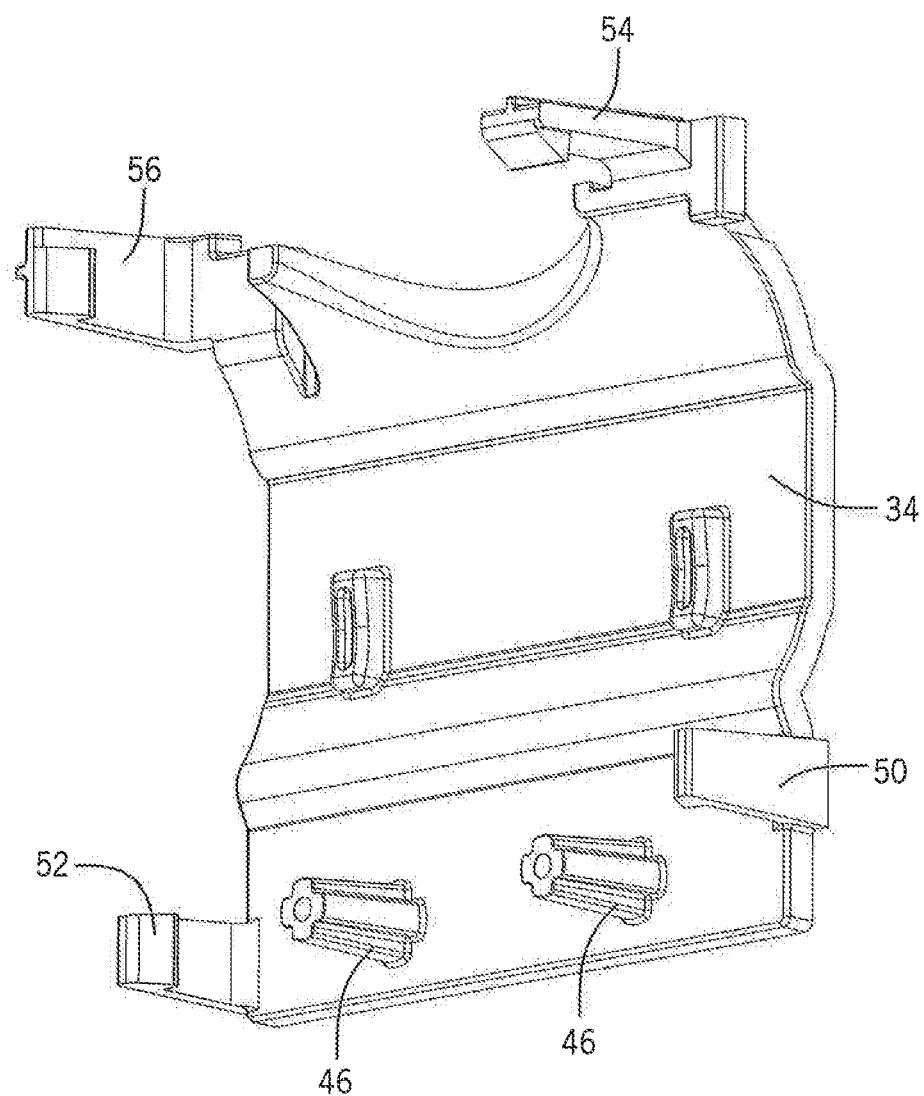

As shown in FIGS. 5 and 6, the base block 32 is adapted for fixed attachment to the boom 14 of the agricultural product sprayer 12, using the nozzle mounting clamp 28. Specifically, the base block 32 defines a mounting saddle 38 in a bottom surface of the base block 32 that is contoured to fit over the nozzle clamp arrangement 28. As shown in FIG. 5, the base block 32 defines a mounting hole 40 extending through the base block 32 for a single threaded fastener (not shown) for securing the base block 32 to the nozzle clamping arrangement 28.

As shown in FIG. 4, the first and second clamping shells 34,36 are adapted and cooperatively configured for attachment to the base block 32, and to one another 34,36, to define an internal cavity 42 of the mounting arrangement 26 between the clamping shells 34,36 and the base block 32, for receiving and retaining the T-joint 22 within the mounting arrangement 26.

As illustrated in FIGS. 5 and 6, the base block and clamping shells 32,34,36 of the exemplary embodiment are configured to include cooperatively engaging alignment features for aligning the clamping shells 34,36 with one another and the base block 32. Specifically, the base block 32 includes two spaced-apart pairs of clamping shell alignment holes 44,44, located on opposite sides of the base block 32, (with only one pair of holes 44,44 being visible in FIG. 5) that are configured to receive a mating pair of spaced-apart alignment posts 46,46 extending from an inner surface of each of the clamping shells 34,36.

As shown in FIGS. 3-6, the base block 32 and clamping shells 34,36 of the exemplary embodiment are further configured to include cooperatively engaging locking features for removably locking both of the clamping shells 34,36 to the base block 32.

The base block 32 includes a pair of locking channels 48 extending along opposite ends of the base block 32 for receiving a pair of first and second base block locking tangs 50,52 extending from opposite edges of the clamping shells 34,36, along a lower end of the clamping shells 34,36. Each of the first and second locking tangs 50,52 includes a barb at a distal end of the tang 50,52 for engaging one of the channels 48 in the base block 32, to thereby secure each of the clamping shells 34,36 individually to the base block 32. As will be appreciated from examination of FIGS. 3-6, the first and second locking tangs 50,52 are offset vertically from one another, in the orientation as depicted, so that they do not hit each other when both the first and second clamping shells 34,36 are locked onto the base block 32.

The clamping shells 34,36 also include a pair of first and second interlocking tab arrangements 54,56 located at opposite top corners of the identical clamping shells 34,36 for locking the clamping shells 34,36 to one another. The first and second interlocking tab arrangements 54,56 each include complimentary locking tangs with barbed ends, and locking surfaces for receiving the barbs. When the clamping shells 34,36 are both installed onto the base block 32, with the alignment posts 46 of the clamping shells 34,36 inserted into the alignment holes 44 of the base block 32, the interlocking tab arrangements 50,52 on the clamping shells engage and lock the clamping shells 34,36 to one another.

Figure 7:
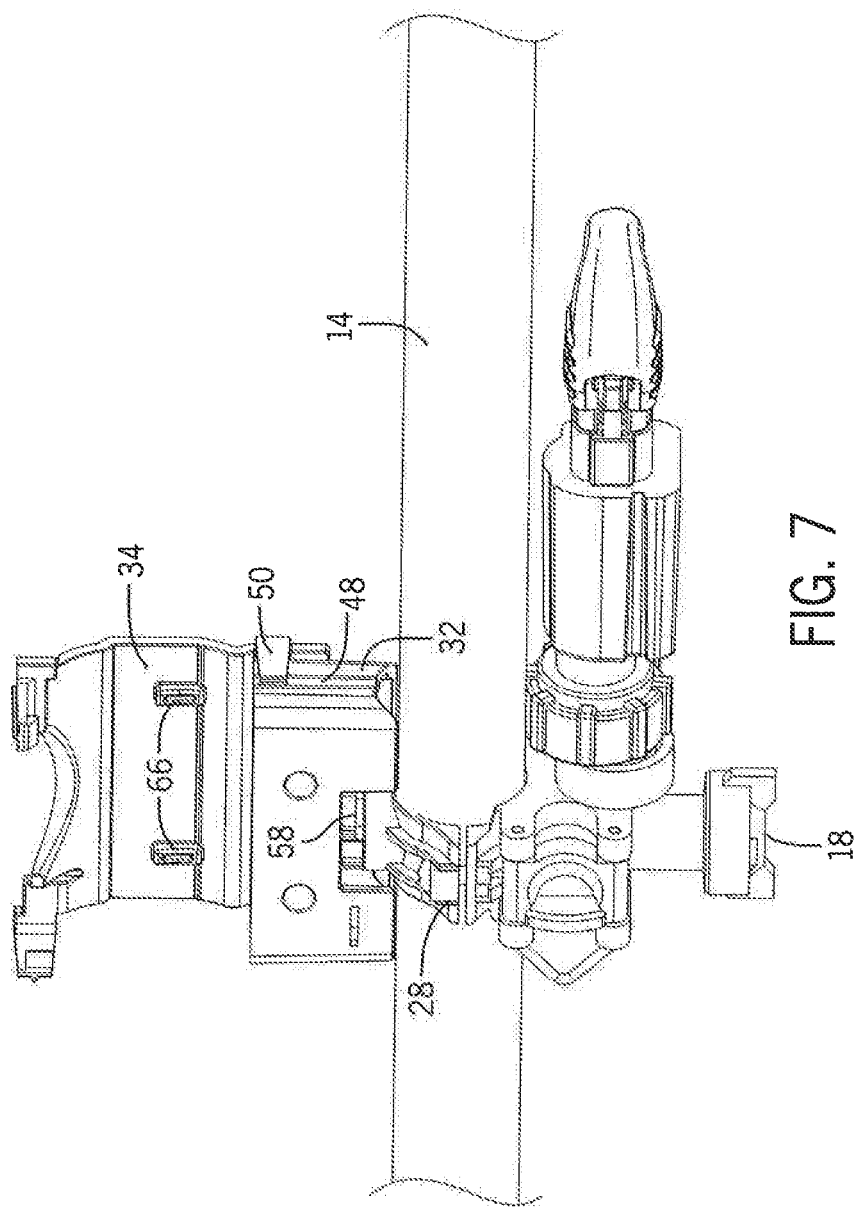
FIGS. 7 and 8 are perspective illustrations showing an exemplary embodiment of a method for securing a T-joint with a T-joint mounting arrangement, according to the invention.
Figure 8:
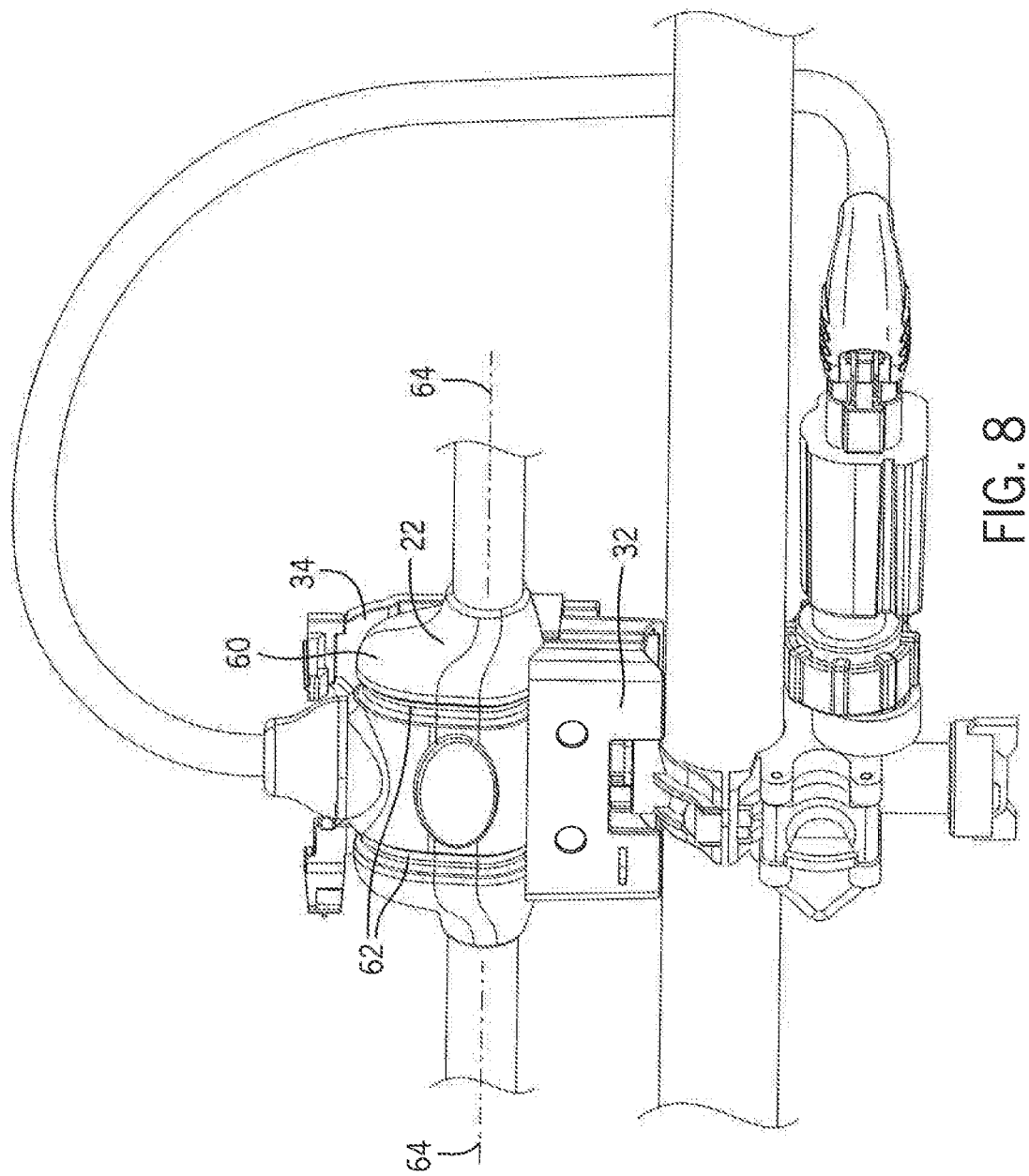

FIGS. 7 and 8 illustrate a method for utilizing the exemplary embodiment of the mounting arrangement 26 for mounting a T-joint 22 to the boom 14, and also illustrate a further feature of the mounting arrangement 26 for positioning and securing the T-joint in the mounting arrangement 26.

FIG. 7 shows the base block 32 attached to one of the clamps 28 attaching the nozzle 18 to the boom 14, using a single threaded fastener in the form of a stud 58 of the clamping arrangement 28 that extends up through the hole 40 in the base block 32 and a nut (not shown) bearing against the upper surface of the base block 32 to secure the base block 32 to the clamp 28 and boom 14. The first clamping plate 34 has also been aligned on the base block by inserting the alignment posts 46 of the first clamping plate 34 in the alignment holes 44 of the base block 32. The locking tangs 50,52 of the first clamping shell 34 have engaged the channels 48 at both ends of the base block 32, to lock the first clamping shell onto the base block 32.

As shown in FIG. 8, the T-joint is then positioned into the portion of the internal cavity 42 defined by the base block 32 and first clamping shell 34, and secured in place by snapping on the second clamping shell 36 to secure the T-joint in the manner shown in FIG. 3.

FIGS. 7 and 8 also illustrate another feature of the exemplary embodiment of the T-joint clamping arrangement 26.

As shown in FIG. 8, each of the T-joints 22, 24 in the exemplary embodiment includes a molded joint-boot 60, to reinforce and seal the wire connections at the T-joints 22,24. The internal cavity 42 of each of the mounting arrangements 26 is configured to receive and retain the joint-boot 60. The external surface of the molded boot of each T-joint 22,24 defines a pair of spaced-apart retention grooves 62 that extend substantially perpendicular to a longitudinal axis 64 of the main body of the cable 20.

As shown in FIG. 7, each of the clamping shells 34,36 includes a pair of spaced apart T-joint retention tabs 66,66 extending into the cavity 42 from internal surfaces of the clamping shells 34,36, for cooperatively engaging the retention grooves 62 of the molded joint-boots 60, to thereby align and further secure the T-joint 22 within the internal cavity 42 of the mounting arrangement 26.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting arrangement for a T-joint in a control cable connectable in electrical communication with an electrical device, including an electrically controlled nozzle, attached to a mounting surface, including the boom of an agricultural product sprayer, the T-joint mounting arrangement comprising:
    a base block adapted for fixed attachment to the mounting surface; and
    a pair of first and second clamping shells adapted and cooperatively configured for attachment to the base block and one another to define an internal cavity of the mounting arrangement between the clamping shells and the base block for receiving and retaining the T-joint within the mounting arrangement.

2. The mounting arrangement of claim 1, wherein the base block is configured for attachment to the boom using a single bolted fastener.

3. The mounting arrangement of claim 1, wherein the T-joint includes a molded joint-boot and the internal cavity is configured to receive and retain the joint-boot.

4. The mounting arrangement of claim 3, wherein the molded boot of the T-joint and the clamping shells respectively include cooperatively engaging alignment features for aligning the T-joint within the internal cavity of the mounting arrangement.

5. The mounting arrangement of claim 1, wherein the base block and clamping shells include cooperatively engaging alignment features for aligning the clamping shells with one another and the base block.

6. The mounting arrangement of claim 1, wherein the base block and clamping shells include cooperatively engaging locking features for removably locking at least one of the clamping shells to the base block.

7. The mounting arrangement of claim 1, wherein the first and second clamping shells are identical.

8. The mounting arrangement of claim 7, wherein the base block and clamping shells include cooperatively engaging alignment features for aligning the clamping shells with one another and the base block.

9. The mounting arrangement of claim 8, wherein the base block and clamping shells include cooperatively engaging locking features for removably locking at least one of the clamping shells to the base block.

10. The mounting arrangement of claim 1, wherein:
the first and second clamping shells are identical;
the T-joint includes a molded joint-boot and the internal cavity is configured to receive and retain the joint-boot;
the molded boot of the T-joint and the clamping shells respectively include cooperatively engaging alignment features for aligning the T-joint within the internal cavity of the mounting arrangement;
the base block and clamping shells include cooperatively engaging alignment features for aligning the clamping shells with one another and the base block; and
the base block and clamping shells include cooperatively engaging locking features for removably locking at least one of the clamping shells to the base block.

11. An agricultural product sprayer having a boom, an electrical device including an electrically controlled nozzle attached to the boom, and a control cable including a T-joint of the control cable connectable in electrical communication with the electrical device, the T-joint being secured to the boom by a T-joint mounting arrangement, the T-joint mounting arrangement comprising:
a base block adapted for fixed attachment to the boom of the agricultural product sprayer; and
a pair of first and second clamping shells adapted and cooperatively configured for attachment to the base block and one another to define an internal cavity of the mounting arrangement between the clamping shells and the base block for receiving and retaining the T-joint within the mounting arrangement.

12. The agricultural product sprayer of claim 11, wherein the base block is configured for attachment to the boom using a single bolted fastener.

13. The agricultural product sprayer of claim 1, wherein the T-joint includes a molded joint-boot and the internal cavity is configured to receive and retain the joint-boot.

14. The agricultural product sprayer of claim 13, wherein the molded boot of the T-joint and the clamping shells respectively include cooperatively engaging alignment features for aligning the T-joint within the internal cavity of the mounting arrangement.

15. The agricultural product sprayer of claim 11, wherein the base block and clamping shells include cooperatively engaging alignment features for aligning the clamping shells with one another and the base block.

16. The agricultural product sprayer of claim 11, wherein the base block and clamping shells include cooperatively engaging locking features for removably locking at least one of the clamping shells to the base block.

17. The agricultural product sprayer of claim 1, wherein:
the first and second clamping shells are identical;
the T-joint includes a molded joint-boot and the internal cavity is configured to receive and retain the joint-boot;
the molded boot of the T-joint and the clamping shells respectively include cooperatively engaging alignment features for aligning the T-joint within the internal cavity of the mounting arrangement;
the base block and clamping shells include cooperatively engaging alignment features for aligning the clamping shells with one another and the base block; and
the base block and clamping shells include cooperatively engaging locking features for removably locking at least one of the clamping shells to the base block.

18. A method for mounting a T-joint of a control cable, connectable in electrical communication with an electrical device, including an electrically controlled controlled nozzle, attached to a mounting surface, such as a boom of an agricultural product sprayer, the method comprising mounting the T-joint to the boom with a T-joint mounting arrangement including:
a base block adapted for fixed attachment to the mounting surface; and
a pair of first and second clamping shells adapted and cooperatively configured for attachment to the base block and one another to define an internal cavity of the mounting arrangement between the clamping shells and the base block for receiving and retaining the T-joint within the mounting arrangement.

19. The method of claim 18, wherein the base block is configured for attachment to the boom using a single bolted fastener, and the method further comprises fixedly attaching the base block to the boom with a single threaded fastener.

20. The method of claim 19, wherein, the first and second clamping shells are identical, the T-joint includes a molded joint-boot and the internal cavity is configured to receive and retain the joint-boot, the molded joint-boot of the T-joint and the clamping shells respectively include cooperatively engaging alignment features for aligning the T-joint within the internal cavity of the mounting arrangement, the base block and clamping shells include cooperatively engaging alignment features for aligning the clamping shells with one another and the base block, the base block and clamping shells include cooperatively engaging locking features for removably locking at least one of the clamping shells to the base block, and the method further comprises:
locking a first one of the clamping shells to the base block;
positioning the molded joint-boot of the T-joint on the base block with the cooperatively engaging alignment features of the first clamping shell and the molded joint-boot of the T-joint engaging one another; and
locking the second clamping shell on to the base block and first clamping shell, to thereby secure the T-joint within the internal cavity of the mounting arrangement.

* * * * *